July 11, 1961   C. R. GAY ET AL   2,991,817
PNEUMATIC TIRE CONSTRUCTION
Filed Sept. 4, 1957

INVENTORS
CLARENCE R. GAY
THEODORE M. KERSKER
BY
W. A. Fraser
ATTY.

2,991,817
PNEUMATIC TIRE CONSTRUCTION
Clarence R. Gay and Theodore M. Kersker, Akron, Ohio, assignors to The Firestone Tire & Rubber Company, Akron, Ohio, a corporation of Ohio
Filed Sept. 4, 1957, Ser. No. 682,001
4 Claims. (Cl. 152—356)

This invention relates to pneumatic tires and more particularly to an improved fabric body construction for pneumatic tires.

This application is a continuation-in-part of our co-pending application Serial No. 477,513, filed December 24, 1954, and now abandoned.

The tire industry manufactures tires having cotton, rayon or nylon fabric strain bearing cords arranged as plies embedded in rubber to provide load-supporting strength. Generally tires bearing heavy loads must have larger amounts of fabric than tires bearing lesser loads. Therefore, it is expected that when the amount of cord in a tire is reduced to save money or improve ride characteristics, the strength of the tire is reduced.

This invention, however, provides means for reducing the amount of fabric in a tire to decrease thereby the number of plies of cords, reducing the cost of the tire and improving not only the riding characteristics but the strength of the tire. More specifically the invention is directed to a novel tire having a reduced number of plies with improved characteristics of cost, ride and strength over a conventional tire of the same size.

It is therefore, an object of this invention to provide a tire having a reduced amount of fabric as compared with a conventional tire of the same size.

It is also an object of the invention to provide a tire having less fabric weight but greater strength than a conventional tire.

These and further objects will be more readily understood by reference to the following specification, claims and drawings of which:

Figure 1:
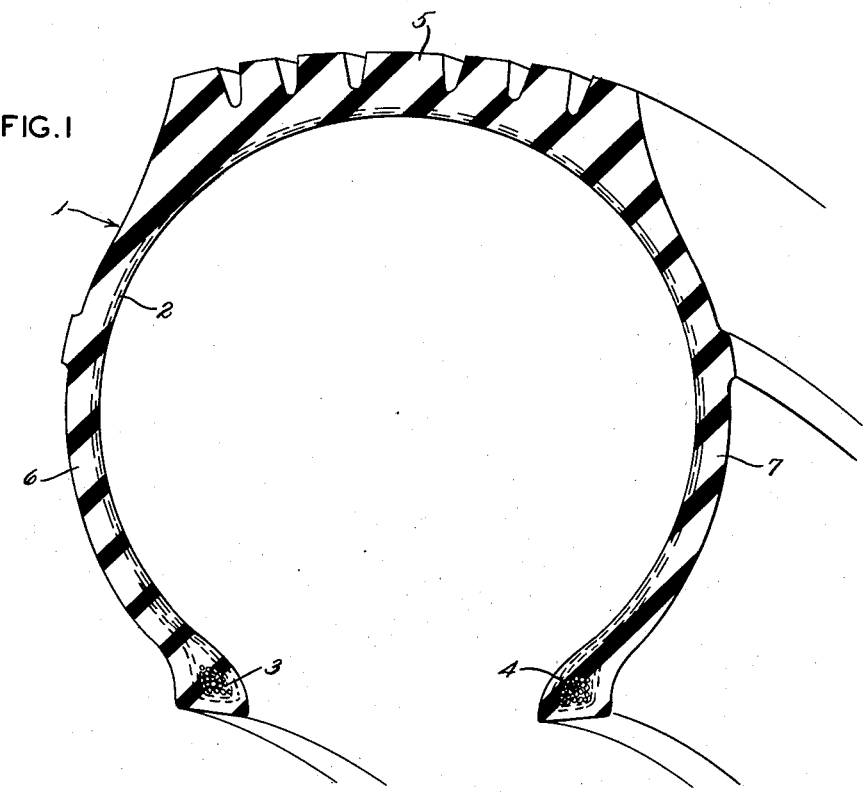
FIGURE 1 is a sectional view in perspective of a tire of the invention.

In reference to FIGURE 1 a pneumatic tire generally indicated at 1 is comprised of a rubberized fabric body portion 2 terminating at its edges in two inextensible bead portions 3 and 4. A rubbery tread 5 is superimposed and bonded as by vulcanization to fabric body portion 2 and rubbery sidewalls 6 and 7 extend from respective edges of the tread along the fabric body, to which they are bonded, to the bead portions 3 and 4.

In a conventional pneumatic passenger tire, such as a 6.70–15 size which is currently popular, the tire industry conventionally uses a construction having a fabric body portion made up of four plies of rubberized cord fabric plied up with the cords of successive plies crossing at angles to provide strength. For example, four plies of 1650/2 rayon fabric is conventionally used in such a 6.70–15 passenger car tire. The number "1650" denotes the denier of the rayon filament yarn whereas the number "two" denotes two filament yarns of 1650 denier twisted together to form a cord. The total bulk or denier strength of a 6.70–15 tire is therefore 1650×2 (filaments) ×4 (plies) or 13,200 denier. In such a tire of one manufacturer, the total weight of cord is 2.568 lbs. and the overall cured gage of the four plies of rubberized fabric is approximately .132 inch.

The present invention provides for example a 6.70–15 size passenger tire having two plies of fabric body portion 2 with an overall cured thickness of only .110 inch and a fabric bulk equivalent of 17,600 denier. The novel feature of this tire is that although the denier bulk content of fabric in the tire is greater than in the four ply tire, the fabric weight is less or only 2.335 lbs. In the preferred form of the invention this novel result is accomplished by using two plies of 4400/2 rubberized rayon fabric with the cords of one ply lapping the cords of the other ply at a critical angle. Although a cord denier of 8800 is preferred it has been found that a cord denier ranging from 8000 to 10,400 is satisfactory. For example, a cord comprised of two yarns of 4000 denier each is within the scope of the invention. By using only two plies of fabric the factory processing or rubberizing of the fabric for a 6.70–15 tire is cut in half with attendant cost savings. Surprisingly enough although the finished tire has less fabric weight than the prior art four ply tire, this novel tire has higher body strength as measured by a plunger energy test. The novel tire construction also provides improved ride characteristics and builds up less heat in operation thereby reducing the possibility of ply separation and tire failure on the vehicle.

Figure 2:
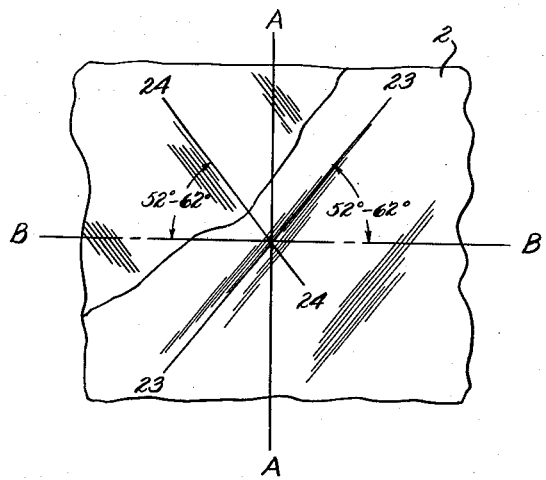
FIGURE 2 is a fragmentary plan view of the body of a tire of the invention showing the angle at which the cords of the two plies intersect.

The cords of each ply such as 23—23 and 24—24 FIG. 2 each form an angle with a line parallel to the axis of the tire through the point where those cords cross on the tire crown or from 52° to 62° with 58° preferred. This angle is shown in FIG. 2 where crown line, A—A, a middle circumferential line on the outer periphery of the tire, is at right angles to the line B—B which is parallel to the tire axis. The critical angle is measured between the cord 23 and line B—B as shown.

Tires according to the invention were built and tested for high speed performance characteristics with the following results:

|  | Control Tire, 4 Ply 1650/2 | Novel Tire, 2 Ply 4400/2 |
|---|---|---|
| Test #1: |  |  |
| Failure Speed, m.p.h. | 90 | 90 |
| Temperature Contained Air, ° F. | 250 | 243 |
| Fabric Weight | 2.57 | 2.335 |
| Test #2: |  |  |
| Failure Speed, m.p.h. | 90 | 90 |
| Temperature Contained Air, ° F. | 308 | 291 |
| Fabric Weight | 2.568 | 2.335 |

To test the novel tire for high speed performance the tires were mounted on standard wheels under a 1,000 lb. load and rotated at a speed of 60 m.p.h. for 6 hours after which the speed was increased 5 m.p.h. every six hours until the tire failed. The temperature of the air in the tire was recorded as was the speed at which the tire failed. The novel tire as well as being more economical than the control tire, operated at a lower temperature.

Four 6.70–15 tires having the novel construction were mounted on test wheels and inflated to 24 p.s.i. A plunger having an end diameter of 1.25 inches was forced radially against the tread of the tire and the deflection of the tire as well as the force necessary to pierce the tire was reported in terms of plunger energy as follows:

Tire:                                  Energy absorption
4 ply 1650/2 control _____ 5175
4 ply 1650/2 control _____ 5130
2 ply 4400/2 cord _____ 5750
2 ply 4400/2 cord _____ 6125
2 ply 4400/2 cord _____ 6100
2 ply 4400/2 cord _____ 5840

This test shows that the two ply tire of the invention has greater strength than the prior art four ply tire.

In the claims:

1. A pneumatic tire having a fabric body portion of not over two plies of fabric, each of said plies made up of individual cords of twisted rayon yarn, each of said cords having a denier of from 8,000 to 10,400, and each cord forming an angle of from 52° to 62° with a line parallel to the tire axis at right angles to a circumferential line on the crown of the tire.

2. A pneumatic tire according to claim 1 wherein the angle is 58°.

3. A pneumatic tire according to claim 1 wherein the denier is 8800 and the angle is 58°.

4. A pneumatic tire having a fabric body portion of not over two plies of fabric, each of said plies made up of individual cords, in turn made up of two twisted rayon yarns, each of said yarns being of at least 4400 denier, and each cord making an angle of from 52° to 62° with a line parallel to the tire axis at right angles to a circumferential line on the crown of the tire.

References Cited in the file of this patent

UNITED STATES PATENTS

| | | |
|---|---|---|
| 1,802,088 | Midgley | Apr. 21, 1931 |
| 2,650,633 | Eger | Sept. 1, 1953 |
| 2,782,830 | Wallace | Feb. 26, 1957 |
| 2,786,507 | Howe et al. | Mar. 26, 1957 |
| 2,826,233 | Cooper | Mar. 11, 1958 |
| 2,869,610 | Lippmann et al. | Jan. 20, 1959 |

FOREIGN PATENTS

| | | |
|---|---|---|
| 512,002 | Great Britain | Aug. 28, 1939 |

UNITED STATES PATENT OFFICE
CERTIFICATE OF CORRECTION
Patent No. 2,991,817                                            July 11, 1961

Clarence R. Gay et al.

It is hereby certified that error appears in the above numbered patent requiring correction and that the said Letters Patent should read as corrected below.

Column 2, line 24, for "or" read -- of --.

Signed and sealed this 28th day of November 1961.

(SEAL)
Attest:

ERNEST W. SWIDER                                        DAVID L. LADD
Attesting Officer                                          Commissioner of Patents